United States Patent [19]

Essig et al.

[11] Patent Number: 4,809,652

[45] Date of Patent: Mar. 7, 1989

[54] LIGHT ALLOY PISTON

[75] Inventors: Gunder Essig, Heilbronn; Manfred Bordt, Neuenstadt, both of Fed. Rep. of Germany

[73] Assignee: Kolbenschmidt Aktiengesellschaft, Neckarsulm, Fed. Rep. of Germany

[21] Appl. No.: 903,317

[22] Filed: Sep. 3, 1986

[30] Foreign Application Priority Data

Sep. 6, 1985 [DE] Fed. Rep. of Germany ....... 3531801

[51] Int. Cl.$^4$ ................................................ F02F 3/00
[52] U.S. Cl. .................................... 123/193 P; 92/208
[58] Field of Search ...................... 123/193 P, 193 R; 92/162 R, 208, 214

[56] References Cited

U.S. PATENT DOCUMENTS

| 1,336,342 | 4/1920 | Blankfield | 123/193 P |
| 1,492,397 | 4/1924 | Roberts | 92/208 |
| 1,877,530 | 9/1932 | Read | 92/208 |
| 2,600,440 | 6/1952 | Smith | 123/193 P |
| 4,468,309 | 3/1987 | Schellmann | 123/193 P |

Primary Examiner—Willis R. Wolfe, Jr.
Assistant Examiner—M. Macy
Attorney, Agent, or Firm—Sprung Horn Kramer & Woods

[57] ABSTRACT

In a light alloy piston each of the load-carrying skirt surfaces is divided into a plurality of load-carrying skirt surface portions. In order to ensure that the upper portion of the piston skirt will carry load on a large area even when the engine is warming up, a plurality of depressions extending in the peripheral direction of the piston skirt are formed in the latter between its clearance-defining top and bottom ends.

10 Claims, 1 Drawing Sheet

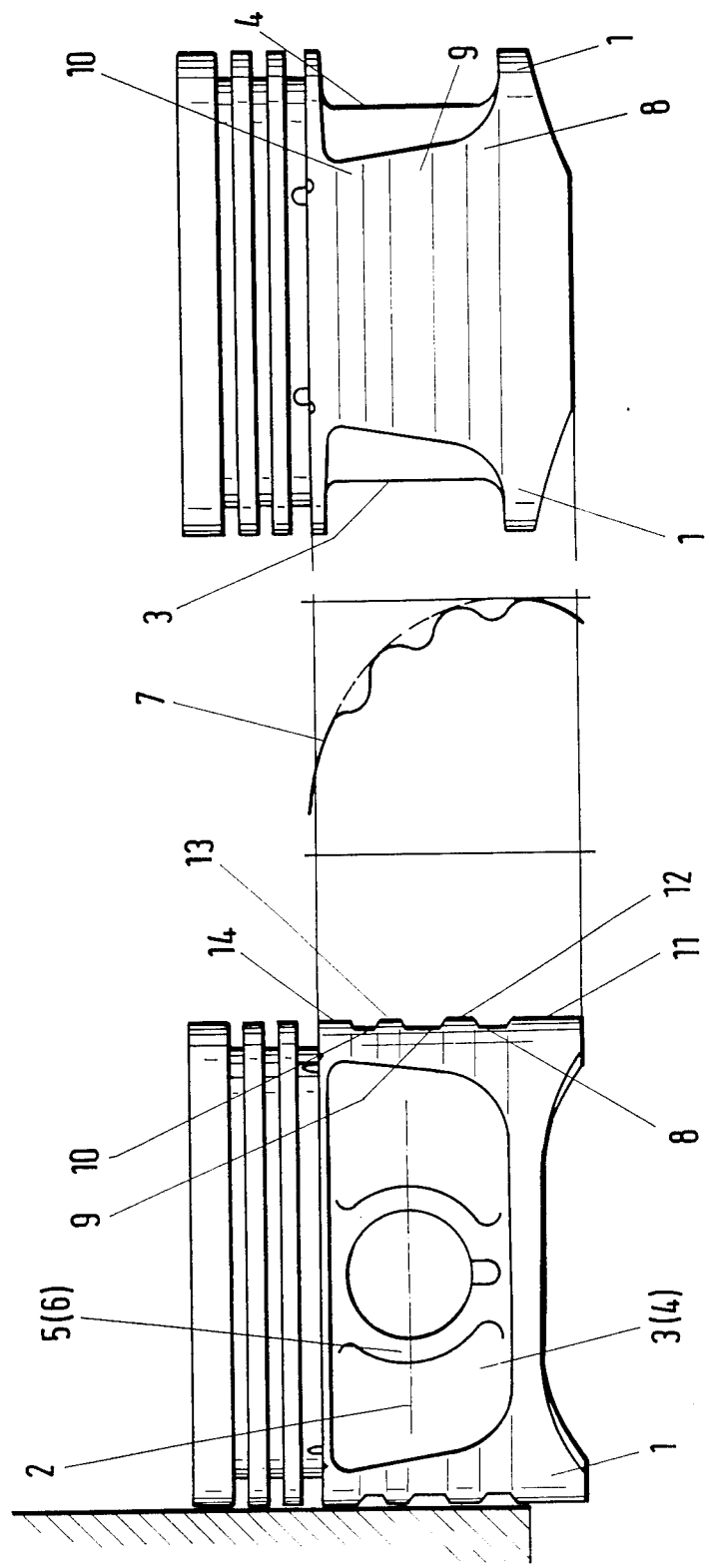

LIGHT ALLOY PISTON

BACKGROUND OF THE INVENTION

This invention relates to a light alloy piston for internal combustion engines, which piston has a convex, oval external shape and comprises a plurality of load-carrying skirt surfaces each of which is divide each into a plurality of load-carrying skirt surface portions.

Such a light alloy piston has been disclosed in the Published German patent application No. 34 37 117. In that known light alloy piston each of the load-carrying skirt surfaces is divided by a depression, which extends in the peripheral direction of the piston, into two skirt surface portions, namely an upper skirt surface portion and a lower one. The depression extends between the clearance-defining upper and lower portions of the sliding surface of the skirt and has a depth which is about twice the peak-to-valley height of the scored outside surface of the skirt. That depression has such an axial height that it will not merge into the cylinder when the piston is at its bottom dead center and that in the cold engine the outside surface of the skirt has between the upper limit of the depression and the lower limit of the clearance-defining upper portion of the sliding surface of the skirt a load-carrying surface portion, which is parallel to the axis of the piston and has an axial height of 1.5 to 4.5 mm, preferably 1.5 to 2.5 mm, and the width of the load-carrying skirt surface portions and the width of the depression are at least as large as the width of the area in which a pressure mark will be formed on the outside surface of the skirt.

That design of the skirt of the piston will improve the floating on the lubricant film so that the losses due to friction will distinctly be reduced and improved sliding properties will be obtained. Having a relatively small depth, the depression constitutes an excellent lubricant reservoir, which contributes to the maintenance of the hydrodynamic lubrication of the load-carrying portions of the skirt. A special advantage resides in that the pressure per unit of area will not increase with the load because the skirt surface portions which will contact the cylinder during an operation under a partial load are relatively narrow and the width of said surface portions progressively increases with the load until they extend on a given half of the piston skirt in a peripheral direction over an arc of as much as 90°. The necessary guidance of the piston in the cylinder along a straight line will be ensured under all operating conditions.

It has now been found that a guidance of the light alloy piston with the required accuracy will not always be ensured when the scored surface of the cold piston defines a large radial clearance adjacent to the top end of the piston skirt owing to the design of the piston and/or owing to the high temperatures in that region and in order to produce good lubricating conditions. In that case the piston will be guided substantially only by the lower surface portion of the piston skirt as the engine is warming up.

SUMMARY OF THE INVENTION

For this reason it is an object of the present invention to modify a piston of the kind described above so that the area in which the upper portion of the piston skirt contacts the cylinder will be relatively large even during the warming-up period, but whereas the losses due to friction and the consumption of lubricant will not be increased.

This object is accomplished in that a plurality of depressions, preferably 3 to 5 depressions, which extend in the peripheral direction of the piston skirt, are provided between the clearance-defining upper and lower portions of the sliding surface of the skirt.

The depressions may be regularly or irregularly spaced apart.

The advantage afforded by the design of the piston skirt in accordance with the invention resides in that a relatively large part of the load-carrying surface portions of the upper portion of the skirt will be guided in contact with the cylinder even during the warming-up period whereas the desirable sliding conditions will not be adversely affected.

In accordance with a desirable further feature of the invention the radial depth of each depression is 1.5 to 2 times the peak-to-valley height of the scored sliding surface of the skirt.

If the scored sliding surface of the skirt has a peak-to-valley height of 5 to 15 micrometers, the depressions will have a radial depth of 7.5 to 30 micrometers. The depth of the depression shall not exceed the upper limit stated because an excessive amount of lubricant will otherwise accumulate in the depression so that the control of the lubricant will be adversely affected. If the depth of the depression is not below the lower limit stated, it will be ensured that the depression will perform its desired function to prevent a formation of a continuous film of lubricant between the load-carrying surface portions of the skirt, even when the scored surface has been worn off to a certain extent.

Each depression suitably has an axial height of 5 to 8 mm. The axial height of the depressions may total 20 to 50% of the length of the piston skirt, preferably one-third of the piston skirt.

The transitions between the depressions and the load-carrying surface portions adjoining said depressions on both sides thereof are suitably rounded so that when the scored surface has been worn after a prolonged running time of the piston it will be ensured that no upwardly facing, sharp-edged shoulder will be formed, which could adversely affect the consumption of lubricant.

The width of the load-carrying skirt surface portions and the width of each depression do not substantially exceed the width of the area in which a pressure mark will appear and said widths are defined by chordlike recesses, which are formed in the as-cast skirt or have been ground or milled and are disposed on both sides of the horizontal plane through the piston pins and set in from the sliding surface of the skirt.

It has been found that it will be particularly desirable to adopt the measures in accordance with the invention in a light alloy piston in which the outer ends of the piston pin bosses are set in from the outside surface of the skirt and are spaced apart 60 to 80% and preferably 65 to 75% of the piston diameter and the width of the load-carrying skirt surface portions and the width of each of the depressions are 70 to 80% of the diameter of the piston.

The invention is preferably applicable to expansion-controlled light alloy pistons having no distinct boundary between the head and the skirt of the piston, such as ring belt pistons and segment-strip pistons, as well as full skirt light alloy pistons having no expansion control element.

The invention can also be utilized in pistons which have a substantial radial clearance at the top end of the piston skirt during the operation of the engine.

The invention is illustrated by way of example in the drawing and will be explained in more detail hereinafter.

BRIEF DESCRIPTION OF THE DRAWING

FIG. 1 is a laterally out of scale side elevation showing the piston according to the invention viewed in the direction of the piston pin axis and with an ever higher lateral out of scale profile of the sliding surface of the skirt, and FIG. 2 is a side elevation of the piston viewed on the pressure or backpressure side.

DETAILED DESCRIPTION OF THE INVENTION

Referring now to FIGS. 1 and 2, on either side of the horizontally extending piston pin boss 2 of the piston, its skirt 1 is recessed to extend along a chord relative to the sliding surface of the skirt so that the latter is formed with recesses 3 and 4 and the piston pin bosses 5,6 are spaced inwardly from said sliding surface. The distance between the outer ends of the piston pin bosses 5, 6 is only 70% of the piston diameter and the bosses are configured so that the piston pin which is to be inserted into said bosses 5, 6 is only 70% of the piston diameter and the piston pin which is to be inserted into said bosses has an overall length amounting to 65% of the piston diameter. The skirt 1 is circular at its lower end. The sliding surface of the skirt has in axial section the shape represented with a high lateral exaggeration by a curve 7 and defines a larger radial clearance at the top end of the skirt 1 than at its lower end. The sliding surface represented by the curve 7 is formed with three peripherally extending depressions 8, 9 and 10, which have a depth of 18 micrometers and merge by rounded transitional portions into the adjoining load-carrying skirt surface portions 11, 12, 13 and 14.

What is claimed is:

1. In a light alloy piston for internal combustion engines, having a convex, oval external shape and comprising a plurality of load-carrying skirt surfaces each of which is divided into a plurality of load-carrying skirt surface portions, the improvement wherein: the skirt of the piston has a convex shape circumscribed by a clearance-defining curve and has a plurality of depressions extending in the peripheral direction of the skirt of the piston, and being in the skirt between its upper and lower end portions wherein the depressions constitute lubricant reservoirs which reduce losses due to friction.

2. The light alloy piston according to claim 1, wherein the depressions are one of regularly and irregularly spaced apart.

3. The light alloy piston according to claim 1, having three to five depressions which extend in the peripheral direction of the piston skirt.

4. The light alloy piston according to claim 1, wherein the piston skirt has a scored surface and the radial depth of each of the depressions is between 1.5 times and twice the peak-to-valley height of the scored surface of the piston skirt.

5. The light alloy piston according to claim 4, wherein the scored surface has a peak-to-valley height between 5 and 15 micrometers.

6. The light alloy piston according to claim 1, wherein the depressions have an axial height of 5 to 8 mm.

7. The light alloy piston according to claim 1, wherein the total axial extent of the depressions totals 20 to 50% of the length of the piston skirt.

8. The light alloy piston according to claim 1, further comprising rounded transitions between the depressions and load-carrying skirt surface portions adjoining said depressions on opposite sides thereof.

9. The light alloy piston according to claim 8, wherein the width of the load-carrying skirt surface portions and the width of the depressions are not substantially in excess of the width of the associated area in which a pressure mark will appear.

10. The light alloy piston according to claim 7, wherein the total axial extent of the depressions totals one-third of the length of the piston skirt.

* * * * *

UNITED STATES PATENT AND TRADEMARK OFFICE
CERTIFICATE OF CORRECTION

PATENT NO. : 4,809,652
DATED : Mar. 7, 1989
INVENTOR(S) : Essig et al.

It is certified that error appears in the above-identified patent and that said Letters Patent is hereby corrected as shown below:

Col. 1, line 52    Delete "the" and substitute --that--

Col. 1, line 65    Delete "above" and substitute --first hereinbefore--

Col. 3, line 1    Delete "The invention can also be utilized" and substitute --The measure proposed in accordance with the invention can also be adopted--

Col. 4, line 38    Delete "the" in second instance and substitute --an--

Signed and Sealed this

Nineteenth Day of June, 1990

Attest:

HARRY F. MANBECK, JR.

*Attesting Officer*      *Commissioner of Patents and Trademarks*